(12) United States Patent
Schlachter et al.

(10) Patent No.: US 6,725,605 B2
(45) Date of Patent: Apr. 27, 2004

(54) SAFETY DEVICE FOR A DOOR WINDOW OF A MOTOR VEHICLE AND METHOD OF MAKING SAME

(75) Inventors: Reimund Schlachter, Mühlacker (DE); Horst Morlok, Weissach (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/105,395

(22) Filed: Mar. 26, 2002

(65) Prior Publication Data

US 2002/0139054 A1 Oct. 3, 2002

(30) Foreign Application Priority Data

Mar. 27, 2001 (DE) .......................... 101 15 124

(51) Int. Cl.⁷ ................................. E06B 7/16
(52) U.S. Cl. ..................................... 49/479.1
(58) Field of Search ...................... 49/475.1, 479.1, 49/498.1, 502, 506

(56) References Cited

U.S. PATENT DOCUMENTS

| 2,361,608 A | | 10/1944 | Doty | |
| 2,361,609 A | | 10/1944 | Doty | |
| 4,888,917 A | * | 12/1989 | Mesnel et al. | 49/479.1 |
| 5,463,832 A | | 11/1995 | Eckart | |
| 5,839,232 A | * | 11/1998 | Backes et al. | 49/479.1 |
| 6,237,287 B1 | * | 5/2001 | Nakagawa et al. | 49/479.1 |
| 6,536,161 B2 | * | 3/2003 | Saito | 49/479.1 |

FOREIGN PATENT DOCUMENTS

| DE | 693 07 117 | 10/1963 |
| DE | 3912897 | 11/1989 |
| EP | 0662400 | 7/1995 |
| EP | 0678412 | 10/1995 |
| GB | 2353553 | 2/2001 |

* cited by examiner

Primary Examiner—Jerry Redman
(74) Attorney, Agent, or Firm—Crowell & Moring LLP

(57) ABSTRACT

In order to avoid an improper bending-open of a sealing element on the door and thus an access gap for a tool, a corner plate is provided in the miter corner of the door. The corner plate is held in the door frame by way of a safety catch, so that the sealing element cannot be pulled out of the member profile of the door.

21 Claims, 4 Drawing Sheets

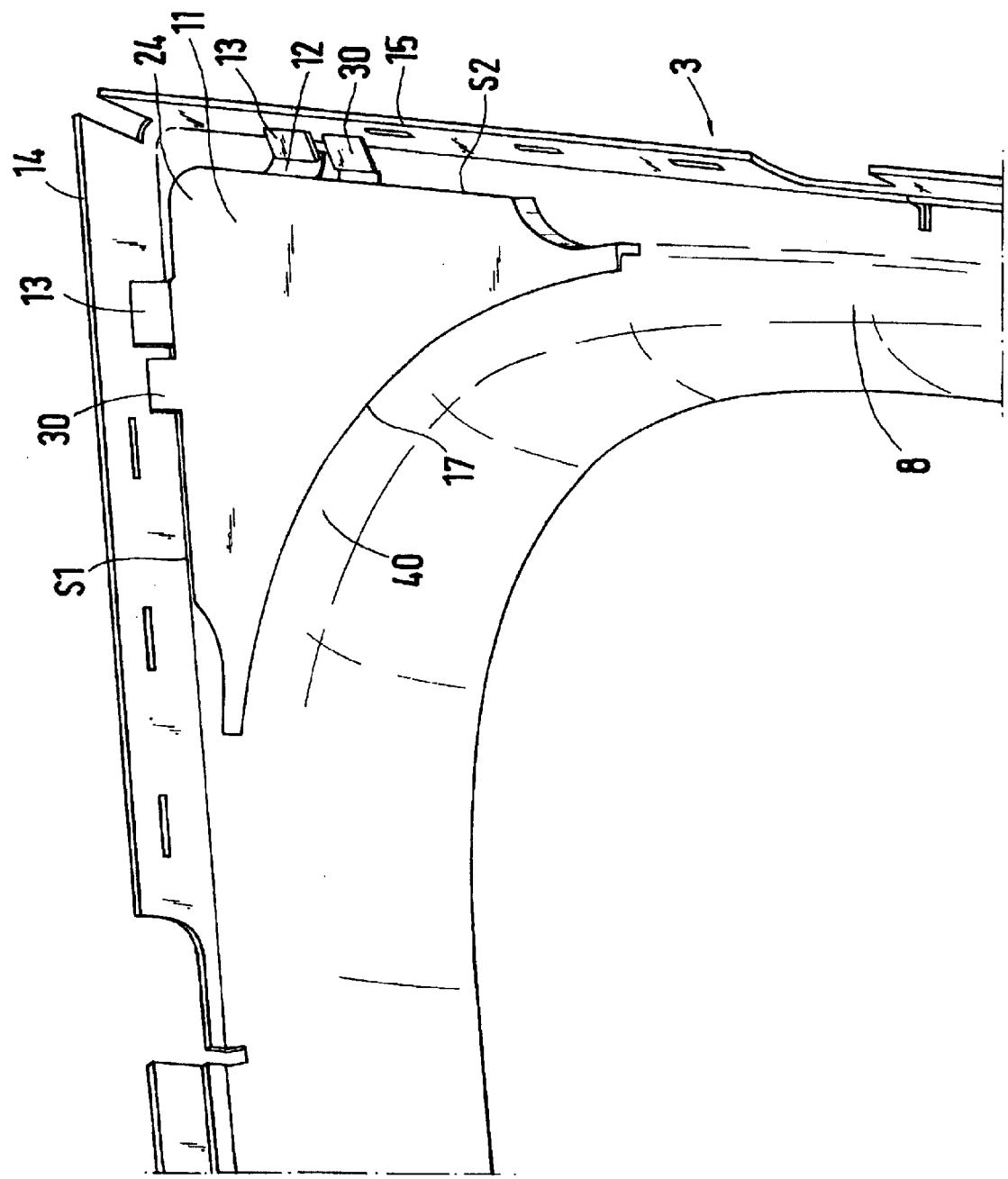

SAFETY DEVICE FOR A DOOR WINDOW OF A MOTOR VEHICLE AND METHOD OF MAKING SAME

BACKGROUND AND SUMMARY OF THE INVENTION

This application claims the priority of German Patent Document DE 101 15 124.1, filed Mar. 27, 2001, the disclosure of which is expressly incorporated by reference herein.

The invention relates to a safety device for a door window of a vehicle, a sealing element being held clamped into a door frame, in which a displaceable window is guided on an exterior side in lateral integrated guides, said window being held so that the window is movable on a face side into an upper guide of the sealing element.

From German Patent Document DE 693 07 117 T2 and corresponding U.S. Pat. No. 5,463,832, a door frame is known which has a filling corner piece in a miter corner, which corner piece, on the one hand, follows the physical course of the angular exterior door opening and, on the other hand, has an interior bent edge which corresponds to the outer radius of the bent area of the member profile of the door.

It is an aspect of the invention to provide a safety device for a door window of a motor vehicle which can easily be mounted between a door frame and a sealing element and ensures a stable positioning of the window in a closed window position.

According to certain preferred embodiments of the invention, this object is achieved by that in at least one miter corner of the door frame, the safety device is arranged which comprises a corner plate, which can be connected with the door frame, and a safety catch which is held in the sealing element, reaches in areas over the corner plate and holds the corner plate between the sealing element and the safety catch. Additional advantageous characteristics are contained in other preferred embodiments.

The principal advantages achieved by way of certain preferred embodiments of the invention are that the sealing element for the window is held in the door frame by way of the safety device and an improper encroachment into the vehicle interior is therefore impossible, in order to, for example, introduce a device for opening the door illegally. For this purpose, a safety device is arranged in a miter corner of the door frame and comprises a corner plate, which can be connected with the door frame, as well as a safety catch held in the sealing element. The safety catch reaches in areas above or below the corner plate, and the corner plate is arranged between the sealing element and the safety catch.

The corner plate is arranged directly in the miter corner of the door and fills a clearance occurring from the sealing curvature to the angular profile frame. In particular, the corner plate has a triangular shape and is held in the door frame between bent legs of the door profile and an interior boundary frame of the door profile by way of corresponding clamping devices and molded-on sections. For fixing the plate, the safety catch reaches over a surface tip of the corner plate so that the latter is arranged between the sealing profile and the door profile.

So that a sealing element, which is held in a more stable manner and cannot be bent open by the effect of force, can be achieved in the door frame, the safety catch includes an angle element arranged in a corner of the sealing element, which angle element has a plane locking plate having a bend. The locking plate is arranged at a receiving distance with respect to the supporting surface of the member profile in order to be able to receive the surface tip of the corner plate. An integrated arrangement of the safety catch in the sealing element of the window is achieved in that the safety catch can be fixed by being sprayed into the sealing element by way of a rubber connection.

For fixing the corner plate in the profile frame, the corresponding clamping devices on the corner plate include nose-type molded-on sections which are opposite molded-out sections on the door profile. The molded-out sections reach over the molded-on sections. Additionally, flexible tongues are arranged on the corner plate and are elastically supported on the legs of the door profile. Furthermore, the corner plate has a rounded-out edge on the frontal side, which edge is provided with a profile edge and, at a distance thereto, is provided with opposite projecting molded-on devices, and an edge of the member profile is arranged between the profile edge and the molded-on sections.

Other objects, advantages and novel features of the present invention will become apparent from the following detailed description of the invention when considered in conjunction with the accompanying drawings.

BRIEF DESCRIPTION OF THE DRAWINGS

FIG. 4 shows another view from the exterior of the vehicle according to FIG. 3 of the miter corner of the door frame profile with an inserted sealing profile.

DETAILED DESCRIPTION OF THE DRAWINGS

Figure 1:
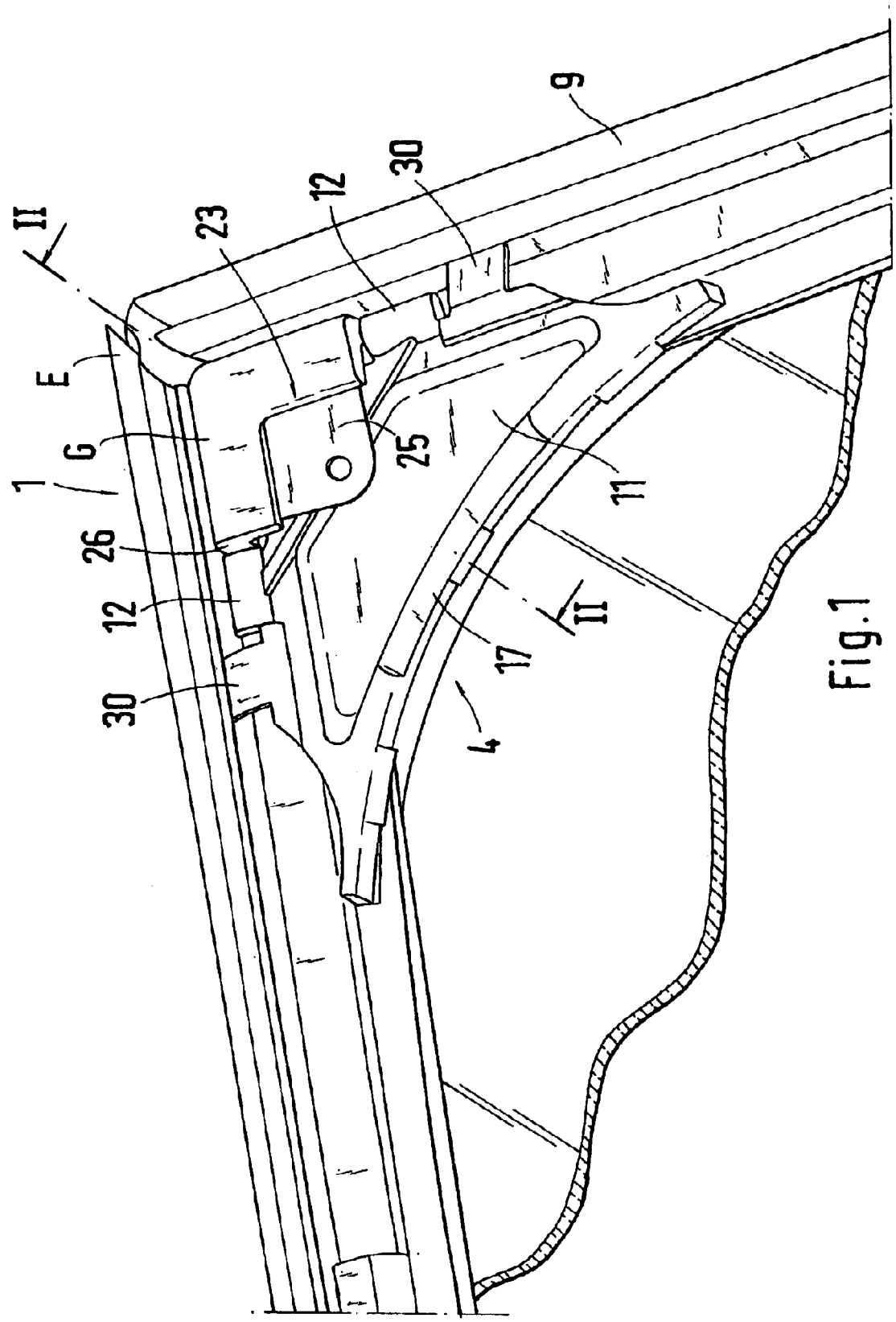
FIG. 1 shows a view from the interior of the vehicle of a safety device in a miter corner of a vehicle door with a corner plate and a safety catch without the door frame profile.
Figure 2:
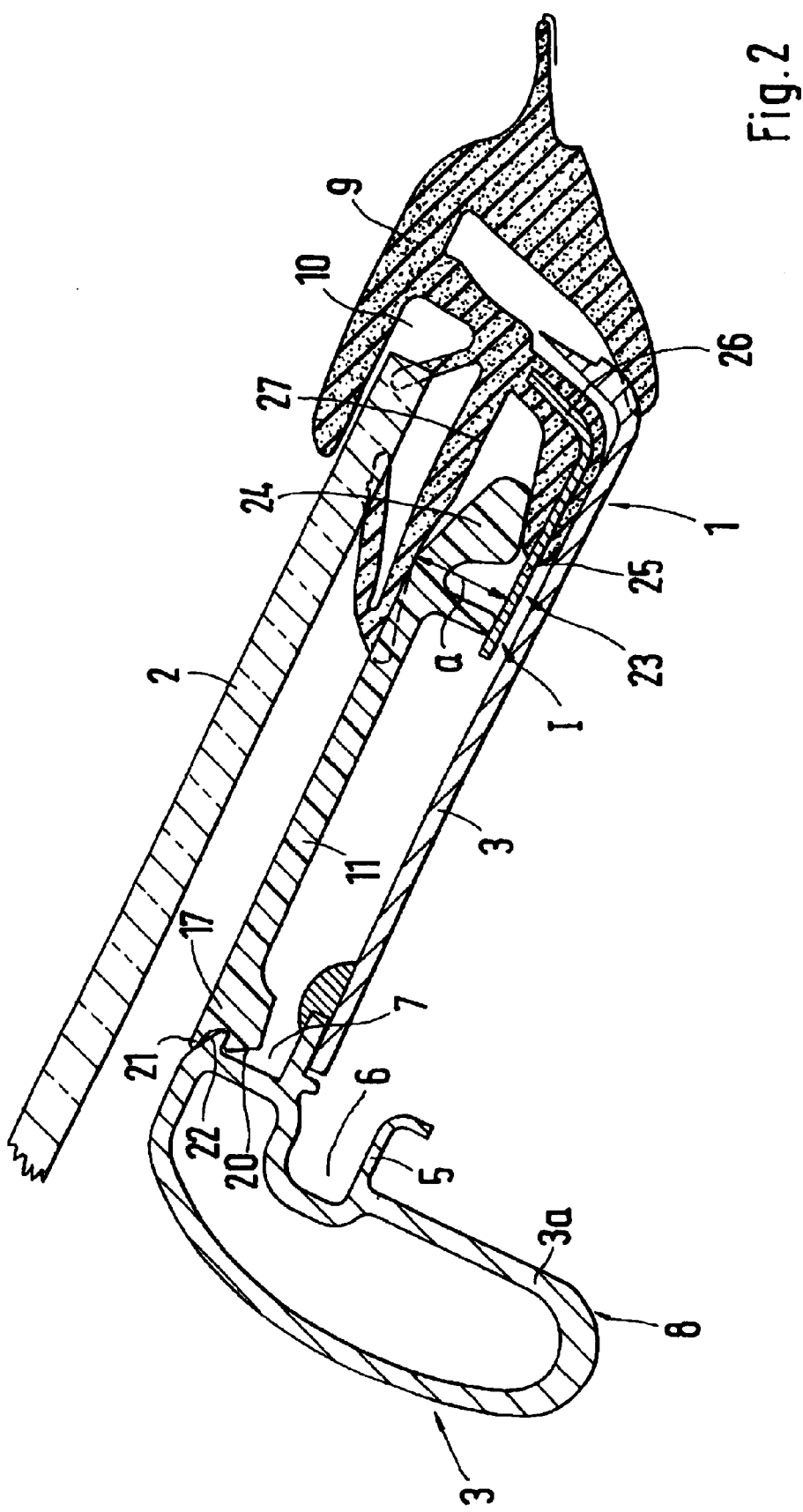
FIG. 2 shows a sectional view according to Line II—II of FIG. 1 of the miter corner of the door with the door profile which is not shown in FIG. 1.
Figure 3:
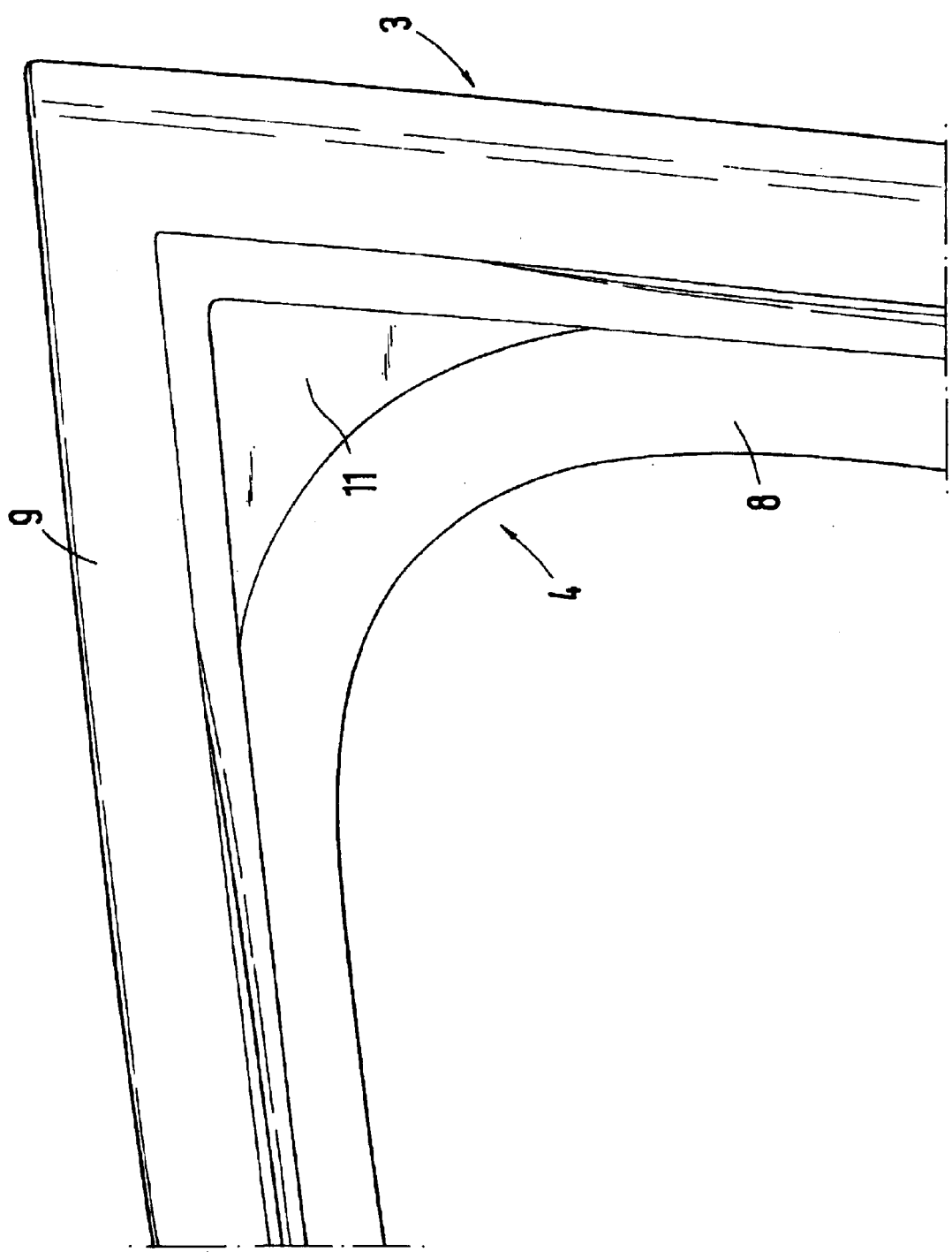
FIG. 3 shows a view from the exterior of the vehicle of the miter corner of the door profile with an inserted corner plate.

The safety device 1 for a door window 2 of a vehicle door with a door frame 3 is in each case arranged in a miter corner 4 of doors of a motor vehicle. The vehicle door comprises basically a door profile 8 including a hollow profile 3a with webs 5 and receiving devices 6, 7, as illustrated in FIG. 2. A profiled sealing element 9 is connected with the door profile 8. In this sealing element 9, the door window 2 is laterally guided in grooves 10 and can be moved by way of an upper edge into an approximately horizontal groove of the sealing element 9.

The safety device 1 comprises a triangular corner plate 11 in the door profile 8 as well as a so-called safety catch 23 in the sealing element 9. The corner plate 11 is in a mutual engagement (I) with the safety catch 23 by way of a mutually supporting connection, as illustrated in FIG. 2. In this position (I), a surface tip 24 of the corner plate 11 is arranged in a position with respect to the safety catch 23 which reaches under or over it.

The triangular corner plate 11 is clipped into the miter corner 4 of the profile 8, for which corresponding clamping elements 12, 13 are provided on the corner plate 11 and on the profile 8. The corner plate 11 is situated between bent legs 14, 15 of the door profile 8, the edges S1 and S2 of the plate 11 being adapted to the course of the legs 14, 15. A rounded edge 17, which connects the edge S1 and S2 faces a rounding or an edge 40 of the door profile 8 and is constructed corresponding to this course.

On this edge (17), projecting molded-on sections 20 are provided which, in connection with a projecting molded-on section in the form of an edge strip 21, receive a profile edge 22 of the door profile 8 between one another.

The clamping element on the corner plate 11 includes several projecting molded-on sections as clamping elements 12, corresponding molded-out devices as clamping elements 13 or erected sheet metal tabs reaching over these molded-on sections.

The safety catch 23 preferably includes a sheet metal angle which, in a corner E of the miter angle 4 of the door, by being surrounded by sprayed rubber, is integrated in the sealing element 9. The catch 23 comprises a plane catch plate 25 having a bend 26, the catch plate 25 being arranged at a distance from the surface 27 of the sealing profile 9 in such a manner that the surface tip 24 of the corner plate 11 can be pushed in-between. Furthermore, so-called elastic tongues 30 for a support on the profile legs 14, 15 are provided on the corner plate 11.

The assembling of the sealing element 9 with the door frame 3 or the door profile 8 takes place with the inclusion of the safety device 1. The corner plate 11 is slid by way of the surface tip 24 under the plate 25 of the safety catch 23, and subsequently the corner plate 11 is clipped into the profile 8 and is fixed by way of the clamping elements 12, 13 in the door profile 8. Subsequently, a clamping of the sealing element 9 in the door profile S takes place. Such a safety device 1 may be provided in each miter corner 4 of a door of the motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety device for a displaceable door window of a vehicle, a sealing element being held clamped into a door frame, in which the displaceable door window is guided on an exterior side in lateral integrated guides, said displaceable door window being movable on a face side into an upper groove in the sealing element, the safety device arranged in at least one miter corner of the door frame and comprising:
   a corner plate, which can be connected with the door frame, and
   a safety catch, which is held in the sealing element, which reaches over an area of the corner plate, and which holds the corner plate so that the cover plate is disposed between the sealing element and the safety catch.

2. A safety device according to claim 1,
   wherein the corner plate has a triangular construction and can be fixed in the door frame between bent legs of a door profile by way of corresponding clamping devices and molded-on sections, and
   wherein the safety catch reaches over a surface tip of the corner plate and is arranged between the surface tip and the door profile.

3. A safety device according to claim 2,
   wherein the safety catch comprises an angle element which is arranged in a corner of the sealing element and which has a catch plate and a bend, and
   wherein a surface of the catch plate is arranged at a distance with respect to a supporting surface of the sealing element so that the corner plate is receivable between the surface of the catch plate and the supporting surface of the sealing element.

4. A safety device according to claim 3,
   wherein the clamping devices on the corner plate comprise molded-on elements which are opposite molded-out elements on the door profile, the molded-on elements reaching around the molded-out elements, and
   wherein elastic tongues are provided on the corner plate and are elastically supported on the legs of the door profile.

5. A safety device according to claim 2, wherein the safety catch can be fixed by in the sealing element by way of an injected rubber connection.

6. A safety device according to claim 5,
   wherein the clamping devices on the corner plate comprise molded-on elements which are opposite molded-out elements on the door profile, the molded-on elements reaching around the molded-out elements, and
   wherein elastic tongues are provided on the corner plate and are elastically supported on the legs of the door profile.

7. A safety device according to claim 2, wherein the corner plate has a rounded edge extending between two approximately equally long lateral edges, said rounded edge corresponding to a rounding of the miter corner.

8. A safety device according to claim 7,
   wherein the clamping devices on the corner plate comprise molded-on elements which are opposite molded-out elements on the door profile, the molded-on elements reaching around the molded-out elements, and
   wherein elastic tongues are provided on the corner plate and are elastically supported on the legs of the door profile.

9. A safety device according to claim 2,
   wherein the clamping devices on the corner plate comprise molded-on elements which are opposite molded-out elements on the door profile, the molded-on elements reaching around the molded-out elements, and
   wherein elastic tongues are provided on the corner plate and are elastically supported on the legs of the door profile.

10. A safety device according to claim 2,
    wherein the corner plate has a rounded edge on a front side, said rounded edge being provided with an edge strip and, at a distance thereto, being provided with opposite projecting molded-on sections, and
    wherein a profiled edge of the door profile is arranged in an engagingly holding manner between the edge strip and the molded-on sections of the rounded edge.

11. A safety device according to claim 10,
    wherein the safety catch comprises an angle element which is arranged in a corner of the sealing element and which has a catch plate and a bend, and
    wherein a surface of the catch plate is arranged at a distance with respect to a supporting surface of the sealing element so that the corner plate is receivable between the surface of the catch plate and the supporting surface of the sealing element.

12. A safety device according to claim 10, wherein the safety catch can be fixed in the sealing element by way of an injected rubber connection.

13. A safety device according to claim 10, wherein the corner plate has a rounded edge extending between two approximately equally long lateral edges, said rounded edge corresponding to a rounding of the miter corner.

14. A safety device according to claim 10,
wherein the clamping devices on the corner plate comprise molded-on elements which are opposite molded-out elements on the door profile, the molded-on elements reaching around the molded-out elements, and
wherein elastic tongues are provided on the corner plate and are elastically supported on the legs of the door profile.

15. A safety device according to claim 1,
wherein the safety catch comprises an angle element which is arranged in a corner of the sealing element and which has a catch plate and a bend, and
wherein a surface of the catch plate is arranged at a distance with respect to a supporting surface of the sealing element so that the corner plate is receivable between the surface of the catch plate and the supporting surface of the sealing element.

16. A safety device according to claim 15, wherein the safety catch can be fixed by in the sealing element by way of an injected rubber connection.

17. A safety device according to claim 15, wherein the corner plate has a rounded edge extending between two approximately equally long lateral edges, said rounded edge corresponding to a rounding of the miter corner.

18. A safety device according to claim 1, wherein the safety catch can be fixed in the sealing element by way of an injected rubber connection.

19. A safety device according to claim 18, wherein the corner plate has a rounded edge extending between two approximately equally long lateral edges, said rounded edge corresponding to a rounding of the miter corner.

20. A safety device according to claim 1, wherein the corner plate has a rounded edge extending between two approximately equally long lateral edges, said rounded edge corresponding to a rounding of the miter corner.

21. A window assembly for a vehicle door, comprising:
a door frame,
a sealing element clamped to the door frame,
a displaceable window which is movable into an upper groove in the sealing element, and
a safety device, arranged in at least one miter corner of the door frame, having a corner plate connectable with the door frame and a safety catch which is held in the sealing element, which extends over an area of the corner plate, and which holds the corner plate so that the corner plate is disposed between the sealing element and the safety catch.

* * * * *